US010175145B2

(12) United States Patent
Liu et al.

(10) Patent No.: US 10,175,145 B2
(45) Date of Patent: Jan. 8, 2019

(54) ONLINE WHEEL RUN-OUT DETECTING DEVICE

(71) Applicant: CITIC Dicastal CO., LTD, Qinhuangdao (CN)

(72) Inventors: Weidong Liu, Qinhuangdao (CN); Jiandong Guo, Qinhuangdao (CN); Bowen Xue, Qinhuangdao (CN)

(73) Assignee: CITIC Dicastal CO., LTD, Qinhuangdao (CN)

(*) Notice: Subject to any disclaimer, the term of this patent is extended or adjusted under 35 U.S.C. 154(b) by 64 days.

(21) Appl. No.: 15/635,752

(22) Filed: Jun. 28, 2017

(65) Prior Publication Data

US 2018/0003592 A1  Jan. 4, 2018

(30) Foreign Application Priority Data

Jun. 29, 2016 (CN) .......................... 2016 1 0492019

(51) Int. Cl.
*G01M 1/22* (2006.01)
*G01M 17/013* (2006.01)

(52) U.S. Cl.
CPC .......... *G01M 17/013* (2013.01); *G01M 1/225* (2013.01)

(58) Field of Classification Search
CPC .................................................. G01M 17/013
See application file for complete search history.

(56) References Cited

U.S. PATENT DOCUMENTS

| 2,211,986 | A | * | 8/1940 | Pfleger | F16H 9/04 474/18 |
| 3,932,961 | A | * | 1/1976 | Pagella | B24B 5/02 451/14 |
| 3,941,170 | A | * | 3/1976 | Maulini | B65B 1/363 141/183 |
| RE29,531 | E | * | 2/1978 | Pagella | B24B 5/02 451/14 |
| 4,811,525 | A | * | 3/1989 | Kimura | B24B 41/002 451/361 |
| 7,086,937 | B2 | * | 8/2006 | Wakazono | B24B 41/04 451/342 |
| 2018/0027722 | A1 | * | 2/2018 | Li | A01B 33/08 |

* cited by examiner

*Primary Examiner* — Manuel L Barbee
*Assistant Examiner* — Raymond L Nimox
(74) *Attorney, Agent, or Firm* — Maier & Maier, PLLC

(57) ABSTRACT

The invention relates to an online wheel run-out detecting device. The online wheel run-out detecting device includes a frame, a chassis, a lifting cylinder, supports, bearing bases, linear bearings, mounting plates, guide shafts, a lifting shaft, a servo motor, a synchronous pulley, a connecting plate, a synchronous belt, a synchronous pulley, a base, a connecting shaft, a servo motor, a shaft sleeve, a lower end cap, a connecting shaft, a shaft sleeve, and an oil cylinder. The online wheel run-out detecting device can meet requirements of online wheel run-out detection, meanwhile it has the characteristics of simple structure, convenience in manufacturing, stable performance and capability of meeting machining requirements on precision, and can meet requirements of automatic production.

2 Claims, 2 Drawing Sheets

ONLINE WHEEL RUN-OUT DETECTING DEVICE

TECHNICAL FIELD

The invention relates to a machining device, in particular to an online wheel bead seat run-out detecting device in a wheel machining process.

BACKGROUND ART

During machining of wheels of automobiles, run-out of the wheels is an important factor which affects the service lives and safety of the wheels, and therefore, run-out of the wheels is required to be detected completely. Hub manufacturers always detect the run-out of the wheels by using semi-automatic run-out detecting equipment manually, but the detecting mode has the problems of low efficiency, high labor cost, poor universality and the like. The invention provides an online wheel run-out detecting device.

SUMMARY OF THE INVENTION

The invention aims to provide an online wheel run-out detecting device.

In order to achieve the above object, the technical scheme of the invention is as follows: an online wheel run-out detecting device mainly comprises a frame, a chassis, a lifting cylinder, supports A, bearing bases, linear bearings, mounting plates, guide shafts, a lifting shaft, a servo motor A, a synchronous pulley A, a connecting plate, a synchronous belt, a synchronous pulley B, a base, a connecting shaft A, a servo motor B, a shaft sleeve A, a lower end cap, a connecting shaft B, a shaft sleeve B, an oil cylinder, bearings A, end caps, a gland, bearings B, another chassis, a flange plate, hinge pins, springs, expanding sections, a connecting shaft C, a protector, an expanding core, a servo motor C, a lead screw A, a linear guide track A, a sliding rack, a linear guide track B, a lead screw B, a servo motor D, a sliding rack B, a run-out detector, a detecting roll and a support B.

The chassis and the support B are fixed on the frame, the mounting plates are fixed on the chassis by the supports A, the bearing bases are fixed on the mounting plates, the lifting shaft is mounted on the bearing bases by the linear bearings, two ends of the lifting shaft are respectively connected with the connecting plate and an output shaft of the lifting cylinder, the servo motor A and the base are fixed on the connecting plate, the shaft sleeve A is mounted on the base by the bearings A and the end caps, the synchronous pulley A is connected with an output shaft of the servo motor A, the synchronous pulley B is connected with the connecting shaft A, and the synchronous belt is respectively connected with the synchronous pulley A and the synchronous pulley B.

The lower end cap, the gland and the chassis are fixed on the shaft sleeve A, the servo motor B is mounted on the lower end cap, the shaft sleeve B is mounted on the shaft sleeve A by the two rows of bearings B and the gland, the oil cylinder is fixed inside the shaft sleeve B, an output end of the oil cylinder is connected with the connecting shaft C, the servo motor B is connected with the shaft sleeve B by the connecting shaft B, the expanding core is connected with the shaft sleeve B by the connecting shaft C, the expanding core, the connecting shaft C and the shaft sleeve B are locked in the peripheral direction and do not rotate relatively, the connecting shaft C and the shaft sleeve B can relatively move in the axial direction, the flange plate is fixed on the chassis, eight T-shaped chutes which are distributed uniformly are formed in cavities of the flange plate and the chassis, bottom surfaces of the eight expanding sections 31 are in one-to-one correspondence to the eight T-shaped chutes respectively, the expanding sections can smoothly slide in the chutes highly precisely, the inner side wall of each expanding section is a 15-degree inclined plane, and two ends of each spring are respectively connected with the flange plate and the corresponding expanding section; and two groups of 15-degree inclined planes which are uniformly distributed at intervals are arranged on side surfaces of the expanding core, the number of the inclined planes in each group is eight, height difference exists between each two inclined planes, side walls of upper ends of the two groups of inclined planes are joined at a conical surface, under the combined action of the tension of the oil cylinder and the elasticity of the springs, side walls of the expanding sections are in contact with the conical surface of the expanding core when the expanding core is located at the bottommost position, the servo motor B drives the expanding core to rotate at an angle of 22.5 degrees by the connecting shaft B, the shaft sleeve B and the connecting shaft C, and the expanding sections which are matched with the inclined planes can be switched between the two groups of inclined planes, which are uniformly distributed at intervals, of the expanding core. The oil cylinder drives the connecting shaft C and the expanding core to move in the up-down direction, the expanding sections are matched with the inclined planes of the expanding core, so that the eight expanding sections synchronously perform centripetal motion and centrifugal motion along the T-shaped chutes which are distributed uniformly, and a high-precision synchronous expanding and shrinking function of the eight expanding sections is fulfilled; and because height difference exists between the two groups of inclined planes, which are distributed uniformly at intervals, of the side surfaces of the expanding core, the servo motor B drives the expanding core to rotate at an angle of 22.5 degrees, the expanding sections which are matched with the inclined planes can be switched between the two groups of inclined planes, which are uniformly distributed at intervals, of the expanding core, the expanding and shrinking diameters of the expanding sections are changed in two different ranges, and finally, large-stroke expanding and shrinking of the expanding sections are realized.

Corresponding pin holes are formed in the chassis and the flange plate, the positioning pins are respectively connected with the pin holes of the chassis and the flange plate, and therefore, assembly accuracy of the chassis and the flange plate is guaranteed.

The servo motor C and the linear guide track A are fixed on the mounting rack, the lead screw A and the sliding rack A are connected with the servo motor C, and the servo motor C can drive the sliding rack A to move along the linear guide track A in the up-down direction by the lead screw A; and the linear guide track B and the servo motor D are fixed on the sliding rack A, the lead screw B and the sliding rack B are connected with the servo motor D, the run-out detector is mounted on the sliding rack B, the detecting roll is mounted on the run-out detector, and the servo motor D can drive the sliding rack B, the run-out detector and the sliding rack B to horizontally move along the liner guide track B in the left-right direction by the lead screw B.

During actual use, a wheel is conveyed to the working position of the device through a roll table, compressed air is fed, the lifting cylinder drives a clamping mechanism to rise, a flange surface of the wheel is in contact with the flange plate, and then the lifting cylinder drives the wheel to be raised to a specified position. An oil cylinder rod of the oil cylinder is in a shrinkage state, and under the effect of the springs, the inclined planes of the expanding sections are in contact with the upper conical surface of the expanding core. According to the diameter of a center hole of the wheel, the servo motor A drives the expanding core to rotate at a specified angle, so that the inclined planes of the expanding sections are matched with the corresponding inclined planes of the expanding core, then the oil cylinder begins to work, and overcomes the elasticity of the springs to drive the connecting shaft B and the expanding core to move upwards, the expanding sections are matched with the inclined planes of the expanding core, and synchronously move outwards along the insides of the eight uniformly distributed T-shaped chutes formed in the cavities of the flange plate and the chassis, finally, the expanding sections are in contact with the center hole of the wheel, and the positioning and tensioning process of the wheel is finished. According to various dimension parameters of the machined wheel, the servo motor C and the servo motor D control the detecting roll to move to a position of a bead seat of an outer rim of the wheel, then the servo motor A begins to work and drives the wheel to rotate, the detecting roll is in contact with various positions in the peripheral direction of the bead seat of the outer rim of the wheel, and the run-out detector detects the run-out value of the wheel finally by analyzing the amount of movement of the detecting roll. Hereto, the run-out detection work of the wheel is finished.

The online wheel run-out detecting device can meet requirements of run-out detection of the wheel, meanwhile has the characteristics of simple structure, convenience in manufacturing, stable performance, and capability of meeting machining requirements on precision, and can meet requirements of automatic production.

Figure 1:
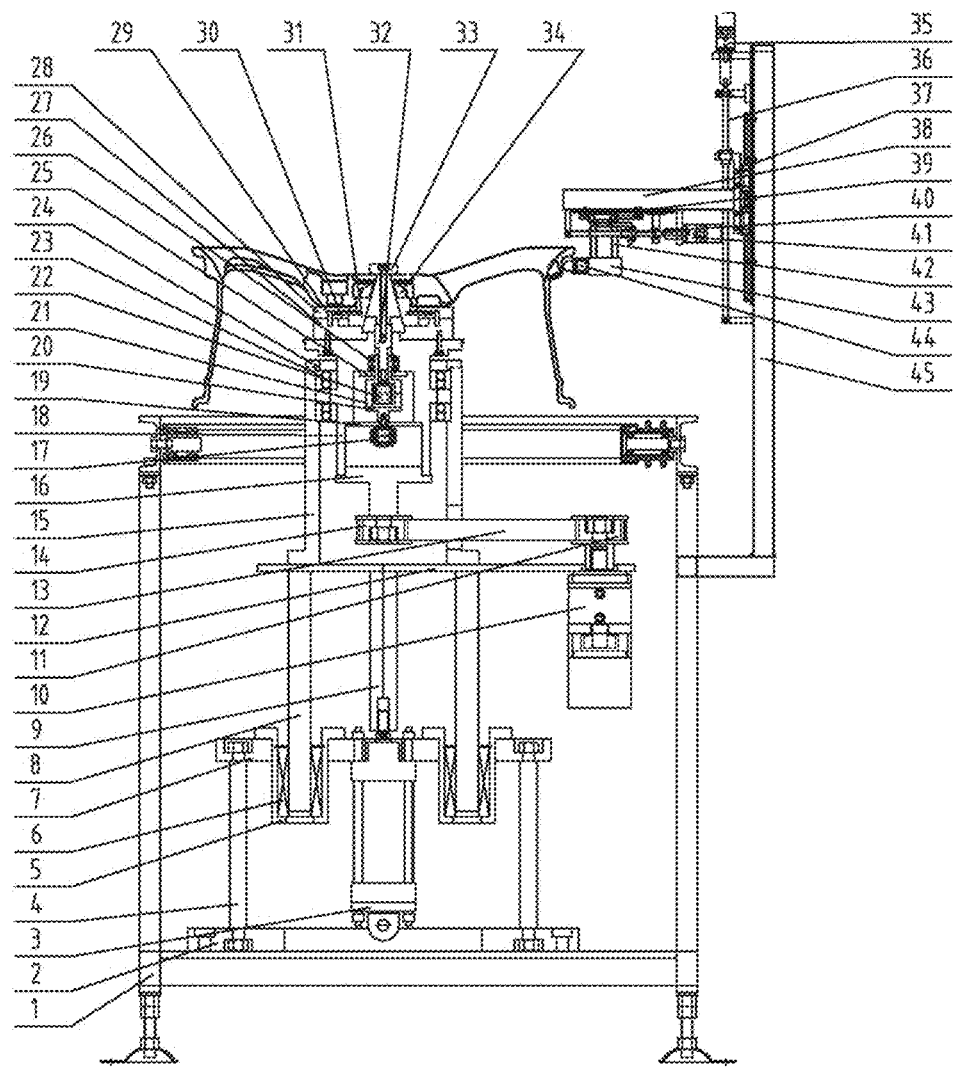
FIG. 1 is a structure diagram of an online wheel run-out detecting device provided by the invention.
Figure 2:
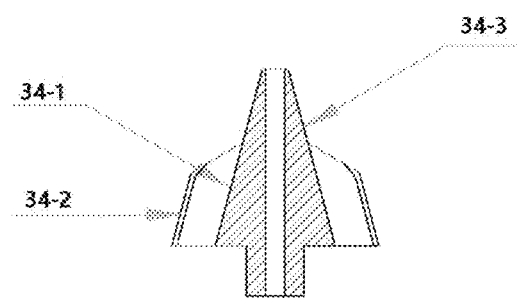
FIG. 2 is a structure diagram of an expanding core in an online wheel run-out detecting device provided by the invention.
Figure 3:
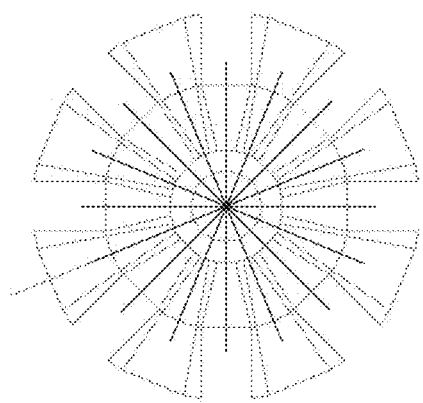
FIG. 3 is a structure diagram of an expanding core in an online wheel run-out detecting device provided by the invention.

In the figures, 1—frame, 2—chassis, 3—lifting cylinder, 4—support A, 5—bearing base, 6—linear bearing, 7—mounting plate, 8—guide shaft, 9—lifting shaft, 10—servo motor A, 11—synchronous pulley A, 12—connecting plate, 13—synchronous belt, 14—synchronous pulley B, 15—base, 16—connecting shaft A, 17—servo motor B, 18—shaft sleeve A, 19—lower end cap, 20—connecting shaft B, 21—shaft sleeve B, 22—oil cylinder, 23—bearing A, 24—end cap, 25—gland, 26—bearing B, 27—chassis, 28—flange plate, 29—hinge pin, 30—spring, 31—expanding section, 32—connecting shaft B, 33—protector, 34—expanding core, 35—servo motor C, 36—lead screw A, 37—linear guide track A, 38—sliding rack A, 39—linear guide track B, 40—lead screw B, 41—servo motor D, 42—sliding rack A, 43—run-out detector, 44—detecting roll, and 45—support B.

DETAILED DESCRIPTION OF THE INVENTION

Hereinafter, details and working conditions of a specific device provided by the invention will be described with reference to the drawings.

The invention provides an online wheel run-out detecting device which comprises a frame 1, a chassis 2, a lifting cylinder 3, supports A 4, bearing bases 5, linear bearings 6, mounting plates 7, guide shafts 8, a lifting shaft 9, a servo motor A10, a synchronous pulley A11, a connecting plate 12, a synchronous belt 13, a synchronous pulley B14, a base 15, a connecting shaft A16, a servo motor B17, a shaft sleeve A18, a lower end cap 19, a connecting shaft B20, a shaft sleeve B21, an oil cylinder 22, bearings A23, end caps 24, a gland 25, bearings B26, a chassis 27, a flange plate 28, hinge pins 29, springs 30, expanding sections 31, a connecting shaft C32, a protector 33, an expanding core 34, a servo motor C35, a lead screw A36, a linear guide track A37, a sliding rack 38, a linear guide track B39, a lead screw B40, a servo motor D41, a sliding rack B42, a run-out detector 43, a detecting roll 44 and a support B45. The chassis 2 and the support B45 are fixed on the frame, the mounting plates 7 are fixed on the chassis 2 by the supports A4, the bearing bases 5 are fixed on the mounting plates 7, the lifting shaft 9 is mounted on the bearing bases 5 by the linear bearings 6, two ends of the lifting shaft 9 are respectively connected with the connecting plate 12 and an output shaft of the lifting cylinder 3, the servo motor A10 and the base 15 are fixed on the connecting plate 12, the shaft sleeve A18 is mounted on the base 15 by the bearings A23 and the end caps 24, the synchronous pulley A11 is connected with an output shaft of the servo motor A10, the synchronous pulley B14 is connected with the connecting shaft A16, and the synchronous belt 13 is respectively connected with the synchronous pulley A11 and the synchronous pulley B14.

The lower end cap 19, the gland 25 and the chassis 27 are fixed on the shaft sleeve A18, the servo motor B17 is mounted on the lower end cap 19, the shaft sleeve B21 is mounted on the shaft sleeve A18 by the two rows of bearings B26 and the gland 25, the oil cylinder 22 is fixed inside the shaft sleeve B21, an output end of the oil cylinder 22 is connected with the connecting shaft C32, the servo motor B17 is connected with the shaft sleeve B21 by the connecting shaft B20, the expanding core 34 is connected with the shaft sleeve B21 by the connecting shaft C32, the expanding core 34, the connecting shaft C32 and the shaft sleeve B21 are locked in the peripheral direction and do not rotate relatively, the connecting shaft C32 and the shaft sleeve B21 can relatively move in the axial direction, the flange plate 28 is fixed on the chassis 27, eight T-shaped chutes which are distributed uniformly are formed in cavities of the flange plate 28 and the chassis 27, bottom surfaces of the eight expanding sections 31 are in one-to-one correspondence to the eight T-shaped chutes respectively, the expanding sections 31 can smoothly slide in the chutes highly precisely, the inner side wall of each expanding section 31 is a 15-degree inclined plane, and two ends of each spring 30 are respectively connected with the flange plate 28 and the corresponding expanding section 31; and two groups of 15-degree inclined planes 34-1 and 34-2 which are uniformly distributed at intervals are arranged on side surfaces of the expanding core 34, the number of the inclined planes in each group is eight, height difference exists between each two inclined planes, side walls of upper ends of the two groups of inclined planes are joined at a conical surface 34-3, under the combined action of the tension of the oil cylinder 22 and the elasticity of the springs 30, side walls of the expanding sections 31 are in contact with the conical surface 34-3 of the expanding core 34 when the expanding core 34 is located at the bottommost position, the servo motor B17 drives the expanding core 34 to rotate at an angle of 22.5 degrees by the connecting shaft B20, the shaft sleeve B21 and the connecting shaft C32, and the expanding sections 31 which are matched with the inclined planes can be switched between the inclined planes 34-1 and 35-2 of the expanding core 34. The oil cylinder 22 drives the connecting shaft C32 and the expanding core 34 to move in the up-down direction, the expanding sections 31 are matched with the inclined planes of the expanding core 34, the eight expanding sections 31 synchronously perform centripetal motion and centrifugal motion along the insides of the eight uniformly distributed T-shaped chutes, and a high-precision synchronous expanding and shrinking function of the eight expanding sections 31 is fulfilled; and because height difference exists between the two groups of inclined planes, which are uniformly distributed at intervals, of side surfaces of the expanding core 34, the servo motor B17 drives the expanding core 34 to rotate at an angle of 22.5 degrees, the expanding sections 31 which are matched with the inclined planes can be switched between the inclined planes 34-1 and 34-2 of the expanding core 34, the expanding and shrinking diameters of the expanding sections 31 are changed in two different ranges, and finally, large-stroke expanding and shrinking of the expanding sections 31 are realized.

Corresponding pin holes are formed in the chassis 27 and the flange plate 28, the positioning pins 29 are respectively connected with the pin holes of the chassis 27 and the flange plate 28, and therefore, the assembly accuracy of the chassis 27 and the flange plate 28 is guaranteed.

The servo motor C35 and the linear guide track A37 are fixed on the mounting rack 45, the lead screw A36 and the sliding rack A38 are connected with the servo motor C35, and the servo motor C35 can drive the sliding rack A38 to move along the linear guide track A37 in the up-down direction by the lead screw A36; and the linear guide track B39 and the servo motor D41 are fixed on the sliding rack A38, the lead screw B40 and the sliding rack B42 are connected with the servo motor D41, the run-out detector 43 is mounted on the sliding rack B42, the detecting roll 44 is mounted on the run-out detector 43, and the servo motor D41 can drive the sliding rack B42, the run-out detector 43 and the sliding rack B42 to horizontally move along the linear guide track B39 in the left-right direction by the lead screw B40.

During actual use, a wheel is conveyed to the working position of the device through a roll table, compressed air is fed, the lifting cylinder 3 drives a clamping mechanism to rise, a flange surface of the wheel is in contact with the flange plate 28, and then the lifting cylinder 3 drives the wheel to be raised to a specified position. An oil cylinder rod of the oil cylinder 22 is in a shrinkage state, and under the effect of the springs 30, the inclined planes of the expanding sections 31 are in contact with the upper conical surface of the expanding core 34. According to the diameter of a center hole of the wheel, the servo motor A10 drives the expanding core 34 to rotate at a specified angle, so that the inclined planes of the expanding sections 31 are matched with the corresponding inclined planes of the expanding core 34, then the oil cylinder 22 begins to work, and overcomes the elasticity of the springs 30 to drive the connecting shaft C32 and the expanding core 34 to move upwards, the expanding sections 31 are matched with the inclined planes of the expanding core 34, and synchronously move outwards along the insides of the eight uniformly distributed T-shaped chutes formed in the cavities of the flange plate 28 and the chassis 27, finally, the expanding sections 31 are in contact with the center hole of the wheel, and the positioning and tensioning process of the wheel is finished. According to various dimension parameters of the machined wheel, the servo motor C35 and the servo motor D41 control the detecting roll 44 to move to a position of a bead seat of an outer rim of the wheel, then the servo motor A10 begins to work and drives the wheel to rotate, the detecting roll 44 is in contact with various positions in the peripheral direction of the bead seat of the outer rim of the wheel, and the run-out detector 43 detects the run-out value of the wheel finally by analyzing the amount of movement of the detecting roll 44. Hereto, the run-out detection work of the wheel is finished.

The invention claimed is:

1. An online wheel run-out detecting device, comprising:
a frame, a chassis, a lifting cylinder, supports A, bearing bases, linear bearings, mounting plates, guide shafts, a lifting shaft, a servo motor A, a synchronous pulley A, a connecting plate, a synchronous belt, a synchronous pulley B, a base, a connecting shaft A, a servo motor B, a shaft sleeve A, a lower end cap, a connecting shaft B, a shaft sleeve B, an oil cylinder, bearings A, end caps, a gland, bearings B, a chassis, a flange plate, hinge pins, springs, expanding sections, a connecting shaft C, a protector, an expanding core, a servo motor C, a lead screw A, a linear guide track A, a sliding rack A, a linear guide track B, a lead screw B, a servo motor D, a sliding rack B, a run-out detector, a detecting roll and a support B;

wherein the chassis and the support B are fixed on the frame, the mounting plates are fixed on the chassis by the supports A, the bearing bases are fixed on the mounting plates, the lifting shaft is mounted on the bearing bases by the linear bearings, two ends of the lifting shaft are respectively connected with the connecting plate and an output shaft of the lifting cylinder, the servo motor A and the base are fixed on the connecting plate, the shaft sleeve A is mounted on the base by the bearings A and the end caps, the synchronous pulley A is connected with an output shaft of the servo motor A, the synchronous pulley B is connected with the connecting shaft A, and the synchronous belt is respectively connected with the synchronous pulley A and the synchronous pulley B;

the lower end cap, the gland and the chassis are fixed on the shaft sleeve A, the servo motor B is mounted on the lower end cap, the shaft sleeve B is mounted on the shaft sleeve A by the bearings B and the gland, the oil cylinder is fixed inside the shaft sleeve B, an output end of the oil cylinder is connected with the connecting shaft B, the servo motor B is connected with the shaft sleeve B by the connecting shaft B, the expanding core is connected with the shaft sleeve B by the connecting shaft C, the expanding core, the connecting shaft C and the shaft sleeve B are locked in the peripheral direction and do not rotate relatively, the connecting shaft C and the shaft sleeve B can relatively move in the axial direction, the flange plate is fixed on the chassis, eight T-shaped chutes which are distributed uniformly are formed in cavities of the flange plate and the chassis, bottom surfaces of the eight expanding sections are in one-to-one correspondence to the eight T-shaped chutes respectively, the expanding sections can smoothly slide in the chutes highly precisely, the inner side wall of each expanding section is a 15-degree inclined plane, and two ends of each spring are respectively connected with the flange plate and the corresponding expanding section ; two groups of 15-degree inclined planes and which are uniformly distributed at intervals are arranged on side surfaces of the expanding core, the number of the inclined planes in each group is eight, height difference exists between each two inclined planes, side walls of upper ends of the two groups of inclined planes are joined at a conical surface, under the combined action of the tension of the oil cylinder and the elasticity of the springs, side walls of the expanding sections are in contact with the conical surface of the expanding core when the expanding core is located at the bottommost position, the servo motor B drives the expanding core to rotate at an angle of 22.5 degrees by the connecting shaft B, the shaft sleeve B and the connecting shaft C, and the expanding sections which are matched with the inclined planes can be switched between the inclined planes and the inclined planes of the expanding core; and the oil cylinder drives the connecting shaft C and the expanding core to move in the up-down direction, the expanding sections are matched with the inclined planes of the expanding core, and therefore, the eight expanding sections perform centripetal motion and centrifugal motion synchronously along the insides of the eight T-shaped chutes which are distributed uniformly; and the servo motor C and the linear guide track A are fixed on the mounting rack, the lead screw A and the sliding rack A are connected with the servo motor C, and the servo motor C can drive the sliding rack A to move along the linear guide track A in the up-down direction by the lead screw A;

and the linear guide track B and the servo motor D are fixed on the sliding rack A, the lead screw B and the sliding rack B are connected with the servo motor D, the run-out detector is mounted on the sliding rack B, the detecting roll is mounted on the run-out detector, and the servo motor D can drive the sliding rack B, the run-out detector and the sliding rack B to horizontally move in the left-right direction along the linear guide track B by the lead screw B.

2. The online wheel run-out detecting device according to claim 1, wherein the corresponding pin holes are formed in the chassis and the flange plate, positioning pins are respectively connected with the pin holes of the chassis and the flange plate, and therefore, assembly accuracy of the chassis and the flange plate is guaranteed.

* * * * *